(12) United States Patent (10) Patent No.: US 12,670,904 B2
Sharifi et al. (45) Date of Patent: Jun. 30, 2026

(54) SELECTING AN AUTOMATED ASSISTANT AS THE PRIMARY AUTOMATED ASSISTANT FOR A DEVICE BASED ON DETERMINED AFFINITY SCORES FOR CANDIDATE AUTOMATED ASSISTANTS

(71) Applicant: GOOGLE LLC, Mountain View, CA (US)

(72) Inventors: Matthew Sharifi, Kilchberg (CH); Victor Carbune, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 341 days.

(21) Appl. No.: 18/083,429

(22) Filed: Dec. 16, 2022

(65) Prior Publication Data

US 2024/0203413 A1 Jun. 20, 2024

(51) Int. Cl.
G10L 15/22 (2006.01)
G10L 15/30 (2013.01)
G10L 15/32 (2013.01)

(52) U.S. Cl.
CPC .............. G10L 15/22 (2013.01); G10L 15/30 (2013.01); *G10L 2015/223* (2013.01)

(58) Field of Classification Search
None
See application file for complete search history.

(56) References Cited

U.S. PATENT DOCUMENTS 10,325,599 B1 * 6/2019 Naidu .................... G06F 40/295
10,593,328 B1 * 3/2020 Wang .................. H04L 65/1059

11,146,522 B1 * 10/2021 Rao ........................ H04L 51/066
11,238,855 B1 * 2/2022 Goetz ..................... G10L 13/00
2016/0104480 A1 * 4/2016 Sharifi .................... G10L 15/22
                                                              704/254
2017/0025124 A1 * 1/2017 Mixter .................... G10L 15/32
2017/0076720 A1 * 3/2017 Gopalan ................. G10L 15/22
2018/0108351 A1 * 4/2018 Beckhardt ............... G10L 15/32
2018/0301147 A1 * 10/2018 Kim ........................ G06F 3/167

(Continued)

FOREIGN PATENT DOCUMENTS

EP            3504705 A1      7/2019

OTHER PUBLICATIONS

European Patent Office; International Search Report and Written Opinion issued in Application No. PCT/US2023/013617; 13 pages; dated Aug. 21, 2023.

*Primary Examiner* — Seong-Ah A Shin
(74) *Attorney, Agent, or Firm* — Gray Ice Higdon

(57) ABSTRACT

Implementations related to selecting a primary automated assistant for a given automated assistant device that is connected to one or more other automated assistant devices in an ecosystem of connected devices. An affinity score is generated for each of a plurality of candidate automated assistants that are capable of executing on the automated assistant device. The affinity score of a given automated assistant for an automated assistant device is indicative of suitability of the automated assistant for the automated assistant device. One of the candidate automated assistants is selected as the primary automated assistant for the device. The primary automated assistant is prioritized when resources of the automated assistant device are allocated to automated assistants executing on the automated assistant device.

20 Claims, 4 Drawing Sheets

(56) References Cited

U.S. PATENT DOCUMENTS

| | | | | |
|---|---|---|---|---|
| 2020/0135191 | A1* | 4/2020 | Nourbakhsh | G10L 15/22 |
| 2020/0184964 | A1* | 6/2020 | Myers | G06F 3/165 |
| 2020/0280616 | A1 | 9/2020 | Sim | |
| 2020/0302932 | A1* | 9/2020 | Schramm | G10L 15/22 |
| 2021/0065693 | A1* | 3/2021 | Sharifi | H04M 3/493 |
| 2022/0230635 | A1* | 7/2022 | Schillmoeller | G06F 3/04842 |
| 2022/0351724 | A1* | 11/2022 | Thomas | G10L 15/32 |
| 2022/0366903 | A1* | 11/2022 | Carbune | G10L 17/14 |
| 2023/0113883 | A1* | 4/2023 | Carbune | G10L 15/22 |
| | | | | 704/235 |
| 2024/0203413 | A1* | 6/2024 | Sharifi | G10L 15/30 |

* cited by examiner

SELECTING AN AUTOMATED ASSISTANT AS THE PRIMARY AUTOMATED ASSISTANT FOR A DEVICE BASED ON DETERMINED AFFINITY SCORES FOR CANDIDATE AUTOMATED ASSISTANTS

BACKGROUND

Humans can engage in human-to-computer dialogs with interactive software applications referred to herein as "automated assistants" (also referred to as "chat bots," "interactive personal assistants," "intelligent personal assistants," "personal voice assistants," "conversational agents," etc.). For example, a human (which when interacting with an automated assistant may be referred to as a "user") may provide an explicit input (e.g., commands, queries, and/or requests) to the automated assistant that can cause the automated assistant to generate and provide responsive output, to control one or more Internet of things (IoT) devices, and/or to perform one or more other functionalities (e.g., assistant actions). This explicit input provided by the user can be, for example, spoken natural language input (i.e., spoken utterances) which may in some cases be converted into text (or other semantic representation) and then further processed, and/or typed natural language input.

In some cases, automated assistants may include automated assistant clients that are executed locally by assistant devices and that are engaged directly by users, as well as cloud-based counterpart(s) that leverage the virtually limitless resources of the cloud to help automated assistant clients respond to users' inputs. For example, an automated assistant client can provide, to the cloud-based counterpart(s), audio data of a spoken utterance of a user (or a text conversion thereof), and optionally data indicative of the user's identity (e.g., credentials). The cloud-based counterpart may perform various processing on the explicit input to return result(s) to the automated assistant client, which may then provide corresponding output to the user. In other cases, automated assistants may be exclusively executed locally by assistant devices and that are engaged directly by users to reduce latency.

Many users may engage automated assistants in performing routine day-to-day tasks via assistant actions. For example, a user may routinely provide one or more explicit user inputs that cause an automated assistant to check the weather, check for traffic along a route to work, start a vehicle, and/or other explicit user input that causes the automated assistant to perform other assistant actions while the user is eating breakfast. As another example, a user may routinely provide one or more explicit user inputs that cause an automated assistant to play a particular playlist, track a workout, and/or provide other explicit user input that causes one of a plurality of automated assistants to perform assistant actions in preparation for the user to go on a run. However, in some instances, a given device can be capable of executing multiple automated assistants, each with varying capabilities. Thus, determining which automated assistant to select to respond to a user request, particularly when the resources of a given automated assistant device are limited, can affect the performance of the device and affect the user experience when interacting with the devices.

SUMMARY

Some implementations disclosed herein relate to prioritizing resources of one or more automated assistant devices to a particular automated assistant in lieu of allocating resources to other automated assistants capable of executing on the assistant device(s). For a device that is capable of executing one or more automated assistants, each automated assistant is evaluated to determine an affinity score that is indicative of affinity for that automated assistant to be the primary automated assistant for the automated assistant device. The primary automated assistant can be prioritized when allocating resources of the automated assistant device to execute an automated assistant on the device. An affinity score for a given automated assistant can be determined based on characteristics of automated assistant, location of the automated assistant device in relation to other automated assistant devices, historic usage of the automated assistant device, and/or other factors that can indicate that a particular automated assistant is more suited for execution on a device than other automated assistants.

A group of automated assistant devices can be connected in an ecosystem of connected devices, whereby each device can be executing one or more automated assistants utilizing the resources of the device. In some instances, a device may only have computing resources to execute a single automated assistant and/or may be required to balance the computing resources of the device between multiple automated assistants, each with its own requirements and competing for the limited resources of the automated assistant device. Thus, for each of the automated assistant devices in the ecosystem, a primary automated assistant can be selected for each of the devices such that, for the automated assistant that is selected for a device as the primary automated assistant, requests can be directed to that automated assistant over other automated assistants that can execute on the device.

As an example, a user can, via one or more mechanisms, add a new device to an ecosystem of connected devices. The ecosystem may include a "Kitchen Speaker," executing Automated Assistant A, a "Living Room Speaker," executing Automated Assistant B and Automated Assistant C, and a "TV," executing Automated Assistant D. The user may add a new automated assistant device, "Living Room Display," which is capable of executing any of Automated Assistants A, B, C, and D. To determine which of the automated assistants to prioritize on the "Living Room Display," an affinity measure can be generated for each of Automated Assistants A, B, C, and D that indicates, for a given device, the suitability of that automated assistant being prioritized over the other automated assistants.

In some instances, only the automated assistant with the highest affinity measure will be selected to execute on the device. In some implementations, other automated assistants may also be permitted to execute on the device, but the automated assistant with the highest affinity measure will be given priority over the resources of the device and one or more of the other automated assistants, also executing on the device, will be permitted to utilize the remainder of the resources. Resources can include, for example, computing power, memory, usage of hardware (e.g., DSP and/or other processors), utilization of one or more software components, and/or other components of the automated assistant device.

In some implementations, affinity measures can be determined based on requests that have been issued to the automated assistant device. For example, if the requests that have been issued by the user to a particular device have been related to cooking (e.g., requests for recipes, setting timers, controlling kitchen appliances), an affinity measure for a "kitchen automated assistant" may be more indicative of suitability for the device than a "music automated assistant" that is configured to allow the user to select music to play via the device. Also, for example, the automated assistant can have a description that indicates its intended usage that has been preset or selected by the user (e.g., a descriptor of "kitchen counter speaker") and the descriptor of the device can be an indication of an automated assistant that is best suited for the device.

In some implementations, the location of the automated assistant device in relation to other devices can be an indication that can be utilized to determine affinity measures for candidate automated assistants for the device. For example, a first device can have "kitchen automated assistant" set as the primary automated assistant for that device. When a second automated assistant device is placed near the first automated assistant device (e.g., in the same room), an affinity score for the "kitchen automated assistant" for the second automated assistant device can reflect that a nearby automated assistant device has been performing "kitchen" tasks and that a "kitchen automated assistant" may be best suited for that automated assistant device. However, as further described below, a different automated assistant may be selected as the primary automated assistant for the second device.

In some implementations, characteristics of the automated assistant device can be utilized to determine the affinity score of an automated assistant for the device. For example, if an automated assistant requires more computing resources, affinity scores for the automated assistant on devices with more computing resources may be higher than the affinity scores of the automated assistant on other devices with fewer resources. Thus, when the automated assistants are selected for each of the automated assistant devices in an ecosystem, the automated assistant with the highest resource requirements may more likely be selected as the primary automated assistant on one or more of the devices with the most computing resources.

In some implementations, automated assistants may be ranked and/or provided with affinity measures based on one or more default configurations, particularly when a device has not been part of the ecosystem previously. For example, a user may set up a new automated assistant device and select that the device is a "kitchen speaker." In response, a default automated assistant (e.g., a "kitchen automated assistant") may be selected as the primary automated assistant and/or a general automated assistant may be selected initially as the primary automated assistant without determining affinity measures for other candidate automated assistants.

In some implementations, one or more heuristic and/or machine learning models may be utilized to determine an affinity measure for a given automated assistant and a given automated assistant device. For example, for a "Kitchen Speaker" device, one or more of the previously described indications may be provided, as input, to a machine learning model, to determine an affinity measure for "Automated Assistant A." The machine learning model can provide, as output, a numerical value indicating the suitability of the "Automated Assistant A" to execute on the "Kitchen Speaker." Similarly, the machine learning model can be provided, as input, indications related to "Kitchen Speaker" and "Automated Assistant B," resulting, as output, a numerical value indicating the suitability of "Automated Assistant B" to execute on the "Kitchen Speaker."

Based on the affinity measures, an automated assistant can be selected as the primary automated assistant for a given automated assistant device. Once an affinity measure has been generated for each of the automated assistants, the automated assistant can be ranked and the highest ranked automated assistant selected as the primary automated assistant. The primary automated assistant can be prioritized over other automated assistants executing on the device. For example, the primary automated assistant may be provided with as much memory space as needed to store, for example, customizations, dictionaries, processing models, and/or other components. Also, for example, the primary automated assistant for a device can be given precedence when two or more automated assistants are requesting usage of hardware, such as a digital signal processor (DSP). Also, for example, the primary automated assistant can be given priority for other computational resources, such as given higher priority threads, when processing requests of the user to ensure quality of service for the primary automated assistant over other automated assistants that may be processing requests simultaneously.

In some implementations, selecting primary automated assistants for the devices of an ecosystem can include selecting the primary automated assistant for a first device, based on ranking the automated assistants executing on the device and/or available for execution on the device, and then selecting the primary automated assistant for the second device in the ecosystem, and so on. In some implementations, for the first device, the highest ranking automated assistant can be selected as the primary automated assistant. For subsequent devices, the highest ranking automated assistant that has not been selected as the primary automated assistant for another device in the ecosystem can be selected as the primary automated assistant for that device. Thus, the user can be provided with at least one instance of each automated assistant on a device in the ecosystem and one particular automated assistant will not be selected as the primary automated assistant on all devices. However, in some implementations, such as when a particular automated assistant is ranked highly over multiple automated assistant devices, the same automated assistant can be selected as the primary automated assistant on multiple devices. For example, for a highly ranked automated assistant, a device from each room of the user's house may have the highly ranked automated assistant executing such that the user has access to the highly ranked automated assistant throughout the house (i.e., in each room with a connected device).

In some implementations, an automated assistant device can have multiple automated assistants executing on the device. For example, a "Kitchen Speaker" may have a primary automated assistant of a "Kitchen Automated assistant" and a "Music Automated Assistant" executing at the same time. In such an instance, for example, the primary automated assistant can be given precedence over resources of the automated assistant device (e.g., memory usage, hardware component usage) and the other automated assistant can be allocated any remaining resources to ensure that the primary automated assistant operates to its full extent and is not delayed from processing requests by the other automated assistant(s) on the device.

In some implementations, one or more of the automated assistants may not be selected as a primary automated assistant on any of the devices of the ecosystem. For example, an automated assistant may be new, may be highly specialized, and/or otherwise may not be utilized as often by the user. In some implementations, the user may be provided with a notification that indicates a particular automated assistant was not selected to be operational on any device and the user may provide explicit instructions to select the unused automated assistant as a primary automated assistant on one or more devices.

In some implementations, the ecosystem may be updated to redistribute primary automated assistants among the devices. For example, when a new device is added to an ecosystem and/or a new automated assistant is added to a device that is already a part of the ecosystem, some or all of the primary automated assistants for the other devices can be changed to reflect that a new device, which is assigned a primary automated assistant, is now a part of the ecosystem. Thus, for each of the devices, affinity measures can be determined for each of the automated assistants, the automated assistants can be ranked for each device, and a primary automated assistant can be selected for each device based on the rankings. In some implementations, automated assistants can be redistributed among the devices of an ecosystem on a periodic basis. For example, when an ecosystem is initially set up, determining affinity scores may be difficult due to a lack of information (e.g., no prior requests, unnamed devices, unknown device locations). Once a threshold number of requests have been processed by the devices, a period of time has elapsed, and/or otherwise subsequent to initially selecting primary automated assistants for the automated assistant devices, the above described process can be performed again and, in some instances, primary automated assistants for one or more of the devices can change.

Thus, implementations, described herein improve performance of an automated assistant device by determining which automated assistant to prioritize when allocating resources. By selecting an automated assistant as a primary automated assistant, a single automated assistant executing on a device better assured of having computing power and resources of the device, particularly when the resources of the device are limited (e.g., are less than required for all candidate automated assistants executing on the device to simultaneously utilize the resources). By selecting a primary automated assistant to process requests for a device, the provided requests can be more efficiently executed, thereby reducing processing time and reducing likelihood that a user will waste additional resources by processing the same request multiple times.

The above description is provided as an overview of only some implementations disclosed herein. Those implementations, and other implementations, are described in additional detail herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
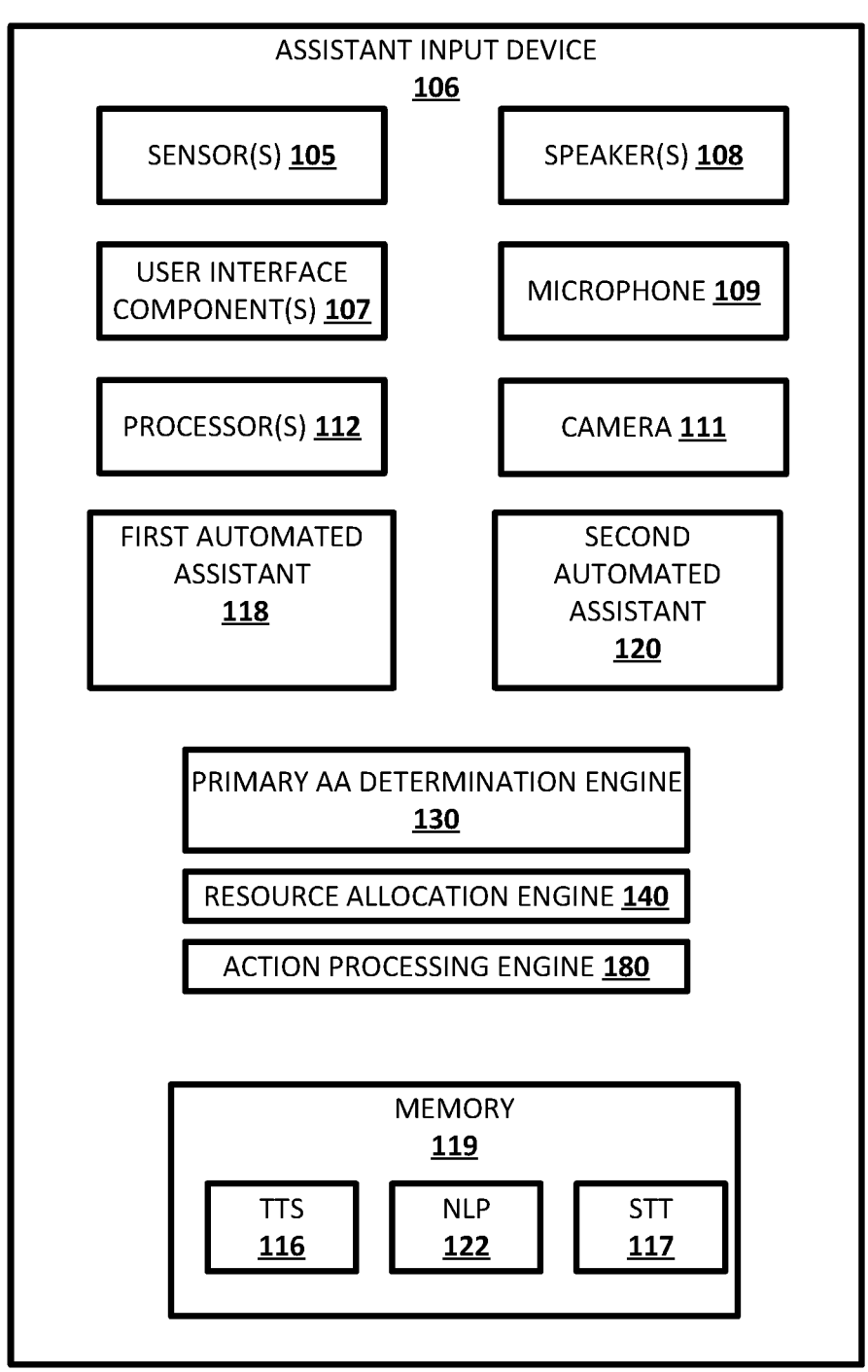
FIG. 1 is a block diagram of an example environment in which implementations disclosed herein may be implemented.

Turning now to FIG. 1, an example environment in which techniques disclosed herein may be implemented is illustrated. The example environment includes an assistant input device 106 having memory 119. Assistant input device 106 can execute a respective instance of a respective automated assistant client 118. However, in some implementations, assistant input device 106 can optionally lack an instance of the respective automated assistant client 118, and still include engine(s) and hardware components for receiving and processing user input directed to an automated assistant (e.g., microphone(s) 109, speaker(s) 108, speech recognition engine(s), natural language processing engine(s), speech synthesis engine(s), and so on). An instance of a first and second automated assistant client 118 and 120 can be applications that are separate from an operating system of the assistant input device 106 (e.g., installed "on top" of the operating system)—or can alternatively be implemented directly by the operating system of the assistant input device 106. As described further below, the automated assistant client 118 can optionally interact with one or more cloud-based automated assistant components in responding to various requests provided by respective user interface components 107 of the respective assistant input device 106. Further, and as also described below, other engine(s) of the assistant input device 106 can optionally interact with one or more of the cloud-based automated assistant components. Still further, assistant input device 106 can have any number of automated assistants executing on the assistant input device 106. However, for exemplary purposes only, a device will be described that generally includes two automated assistants executing on the device 106 and sharing at least some of the resources of the assistant input device, such as memory 119 and/or processor(s) 112.

The assistant input device 106 may include, for example, one or more of: a desktop computing device, a laptop computing device, a tablet computing device, a mobile phone computing device, a computing device of a vehicle of the user (e.g., an in-vehicle communications system, an in-vehicle entertainment system, an in-vehicle navigation system), an interactive standalone speaker (e.g., with or without a display), a smart appliance such as a smart television or smart washer/dryer, a wearable apparatus of the user that includes a computing device (e.g., a watch of the user having a computing device, glasses of the user having a computing device, a virtual or augmented reality computing device), and/or any IoT device capable of receiving user input directed to the automated assistant. Additional and/or alternative assistant input devices may be provided. In some implementations, a plurality of assistant input devices 106 can be associated with each other in various ways in order to facilitate performance of techniques described herein. For example, in some implementations, a plurality of assistant input devices 106 may be associated with each other by virtue of being communicatively coupled via one or more networks (e.g., via the network(s) 110 of FIG. 2). This may be the case, for instance, where the plurality of assistant input devices 106 are deployed across a particular area or environment, such as a home, a building, and so forth. Additionally, or alternatively, in some implementations, the plurality of assistant input devices 106 may be associated with each other by virtue of them being members of a coordinated ecosystem that are at least selectively accessible by one or more users (e.g., an individual, a family, employees of an organization, other predefined groups, etc.). In some of those implementations, the ecosystem of the plurality of assistant input devices 106 can be manually and/or automatically associated with each other in a device topology representation of the ecosystem.

In various implementations, one or more assistant input devices 106 may include one or more respective sensors 105 that are configured to provide, with approval from corresponding user(s), sensor data indicative of one or more environmental conditions present in the environment of the device. In some of those implementations, automated assistants 118 and/or 120 can generate fulfillment data to satisfy a spoken utterance from a user that is associated with the ecosystem. The spoken utterance can be satisfied by rendering responsive content (e.g., audibly and/or visually) at one or more of the assistant input devices 106, by causing one or more of the assistant input devices 106 to be controlled based on the spoken utterance, and/or by causing one or more of the assistant input devices 106 to perform any other action to satisfy the spoken utterance.

The respective sensors 105 may come in various forms. Some assistant input devices 106 may be equipped with one or more digital cameras that are configured to capture and provide signal(s) indicative of movement detected in their fields of view. Additionally, or alternatively, some assistant input devices 106 may be equipped with other types of light-based sensors 105, such as passive infrared ("PIR") sensors that measure infrared ("IR") light radiating from objects within their fields of view. Additionally, or alternatively, some assistant input devices 106 may be equipped with sensors 105 that detect acoustic (or pressure) waves, such as one or more microphones 109.

Additionally, or alternatively, in some implementations, the sensors 105 may be configured to detect other phenomena associated with the environment that includes at least a part of the ecosystem. For example, in some embodiments, a given one of the assistant devices 106 may be equipped with a sensor 105 that detects various types of wireless signals (e.g., waves such as radio, ultrasonic, electromagnetic, etc.) emitted by, for instance, other assistant devices carried/operated by a particular user (e.g., a mobile device, a wearable computing device, etc.) and/or other assistant devices in the ecosystem. For example, some of the assistant devices 106 of an ecosystem may be configured to emit waves that are imperceptible to humans, such as ultrasonic waves or infrared waves, that may be detected by one or more of the assistant input devices 106 (e.g., via ultrasonic/infrared receivers such as ultrasonic-capable microphones). Also, for example, in some embodiments, a given one of the assistant devices 106 may be equipped with a sensor 105 to detect movement of the device (e.g., accelerometer), temperature in the vicinity of the device, and/or other environmental conditions that can be detected near the device (e.g., a heart monitor that can detect the current heart rate of the user).

Additionally, or alternatively, various assistant devices may emit other types of human-imperceptible waves, such as radio waves (e.g., Wi-Fi, Bluetooth, cellular, etc.) that may be detected by other assistant devices carried/operated by a particular user (e.g., a mobile device, a wearable computing device, etc.) and used to determine an operating user's particular location. In some implementations, GPS and/or Wi-Fi triangulation may be used to detect a person's location, e.g., based on GPS and/or Wi-Fi signals to/from the assistant device. In other implementations, other wireless signal characteristics, such as time-of-flight, signal strength, etc., may be used by various assistant devices, alone or collectively, to determine a particular person's location based on signals emitted by the other assistant devices carried/operated by the particular user.

Additionally, or alternatively, in some implementations, one or more of the assistant input devices 106 of an ecosystem may perform speaker recognition to recognize a user from their voice. For example, some instances of the automated assistant may be configured to match a voice to a user's profile, e.g., for purposes of providing/restricting access to various resources. Various techniques for user identification and/or authorization for automated assistants have been utilized. For example, in identifying a user, some automated assistants utilize text-dependent techniques (TD) that is constrained to invocation phrase(s) for the assistant (e.g., "OK Assistant" and/or "Hey Assistant"). With such techniques, an enrollment procedure is performed in which the user is explicitly prompted to provide one or more instances of a spoken utterance of the invocation phrase(s) to which the TD features are constrained. Speaker features (e.g., a speaker embedding) for a user can then be generated through processing of the instances of audio data, where each of the instances captures a respective one of the spoken utterances. For example, the speaker features can be generated by processing each of the instances of audio data using a TD machine learning model to generate a corresponding speaker embedding for each of the utterances. The speaker features can then be generated as a function of the speaker embeddings, and stored (e.g., on device) for use in TD techniques. For example, the speaker features can be a cumulative speaker embedding that is a function of (e.g., an average of) the speaker embeddings. Text-independent (TI) techniques have also been proposed for utilization in addition to or instead of TD techniques. TI features are not constrained to a subset of phrase(s) as is in TD. Like TD, TI can also utilize speaker features for a user and can generate those based on user utterances obtained through an enrollment procedure and/or other spoken interactions, although many more instances of user utterances may be required for generating useful TI speaker features.

After the speaker features are generated, the speaker features can be used in identifying the user that spoke a spoken utterance. For example, when another spoken utterance is spoken by the user, audio data that captures the spoken utterance can be processed to generate utterance features, those utterance features compared to the speaker features, and, based on the comparison, a profile can be identified that is associated with the speaker features. As one particular example, the audio data can be processed, using the speaker recognition model, to generate an utterance embedding, and that utterance embedding compared with the previously generated speaker embedding for the user in identifying a profile of the user. For instance, if a distance metric between the generated utterance embedding and the speaker embedding for the user satisfies a threshold, the user can be identified as the user that spoke the spoken utterance.

Each of the assistant input devices 106 further includes respective user interface component(s) 107, which can each include one or more user interface input devices (e.g., microphone, touchscreen, keyboard, and/or other input devices) and/or one or more user interface output devices (e.g., display, speaker, projector, and/or other output devices). As one example, user interface components 107 of assistant input device 106 can include only speaker(s) 108 and microphone(s) 109, whereas user interface components 107 of another assistant input device 106 can include speaker(s) 108, a touchscreen, and microphone(s) 109.

Each of the assistant input devices 106 may include one or more memories 119 for storage of data and software applications, one or more processors 112 for accessing data and executing applications, and other components that facilitate communication over a network. The operations performed by one or more of the assistant input devices 106 and/or by the automated assistants 118 and/or 120 may be distributed across multiple computer systems. The automated assistant may be implemented as, for example, computer programs running on one or more computers in one or more locations that are coupled to each other through a network (e.g., the network(s) 110 of FIG. 2).

As noted above, in various implementations, each of the assistant input devices 106 may operate a respective first automated assistant 118 and, in some instances, a second automated assistant 120. In various embodiments, each automated assistant client 118 and/or 120 may include a respective speech capture/text-to-speech (TTS)/speech-to-text (STT) module 114. In other implementations, one or more aspects of the respective speech capture/TTS/STT module(s) may be implemented separately from the respective automated assistant client 118 (e.g., stored in memory 119 and accessible to one or more of the automated assistants executing on the automated assistant device).

Each respective speech capture/TTS/STT modules 116 and/or 117 may be configured to perform one or more functions including, for example: capture a user's speech (speech capture, e.g., via respective microphone(s) 109); convert that captured audio to text and/or to other representations or embeddings (STT) using speech recognition model(s) stored in a database; and/or convert text to speech (TTS) using speech synthesis model(s) stored in a database. Instance(s) of these model(s) may be stored locally, in memory 119, at each of the respective assistant input devices 106 and/or accessible by the assistant input devices (e.g., over the network(s) 110 of FIG. 2). In some implementations, because one or more of the assistant input devices 106 may be relatively constrained in terms of computing resources (e.g., processor cycles, memory, battery, etc.), the respective speech capture/TTS/STT modules that are local to each of the assistant input devices 106 may be configured to convert a finite number of different spoken phrases to text (or to other forms, such as lower dimensionality embeddings) using the speech recognition model(s). Other speech input may be sent to one or more of the cloud-based automated assistant components.

STT module 117 may be configured to convert audio data captured by the automated assistant input device 106 into text (which may then be provided to natural language processing (NLP) module 122) using speech recognition model(s). TTS module 116 may be configured to convert textual data (e.g., text formulated by automated assistant) into computer-generated speech output using speech synthesis model(s). In some implementations, the TTS module 116 may provide the computer-generated speech output to one or more of the assistant devices 106 to be output directly, e.g., using respective speaker(s) 108 of the respective assistant devices. In other implementations, textual data (e.g., a client device notification included in a command) generated by the automated assistant TTS module 116 may be provided to a speech capture/TTS/STT module of a respective automated assistant, which may then locally convert the textual data into computer-generated speech using the speech synthesis model(s), and cause the computer-generated speech to be rendered via local speaker(s) 108 of the respective assistant devices.

The NLP module 122 processes natural language input generated by users via the assistant input device 106 and may generate annotated output for use by one or more of the automated assistants 118 and/or 120. For example, the NLP module 122 may process natural language free-form input that is generated by a user via one or more respective user interface input devices of the assistant input devices 106.

The annotated output generated based on processing the natural language free-form input may include one or more annotations of the natural language input and optionally one or more (e.g., all) of the terms of the natural language input.

In some implementations, the NLP module 122 is configured to identify and annotate various types of grammatical information in natural language input. For example, the NLP module 122 may include a part of speech tagger configured to annotate terms with their grammatical roles. In some implementations, the NLP module 122 may additionally and/or alternatively include an entity tagger (not depicted) configured to annotate entity references in one or more segments such as references to people (including, for instance, literary characters, celebrities, public figures, etc.), organizations, locations (real and imaginary), and so forth. In some implementations, data about entities may be stored in one or more databases, such as in a knowledge graph (not depicted). In some implementations, the knowledge graph may include nodes that represent known entities (and in some cases, entity attributes), as well as edges that connect the nodes and represent relationships between the entities.

The entity tagger of the NLP module 122 may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

In some implementations, the NLP module 122 may additionally and/or alternatively include a coreference resolver (not depicted) configured to group, or "cluster," references to the same entity based on one or more contextual cues. For example, the coreference resolver may be utilized to resolve the term "it" to "front door lock" in the natural language input "lock it", based on "front door lock" being mentioned in a client device notification rendered immediately prior to receiving the natural language input "lock it".

In some implementations, one or more components of the NLP module 122 may rely on annotations from one or more other components. For example, in some implementations the named entity tagger may rely on annotations from the coreference resolver and/or dependency parser in annotating all mentions to a particular entity. Also, for example, in some implementations the coreference resolver may rely on annotations from the dependency parser in clustering references to the same entity. In some implementations, in processing a particular natural language input, one or more components of the NLP module 122 may use related data outside of the particular natural language input to determine one or more annotations—such as an assistant input device notification rendered immediately prior to receiving the natural language input on which the assistant input device notification is based.

In some implementations, one or more of the assistant input devices 106 can include a second automated assistant 120 that includes one or more of the components that share characteristics with components that are described herein with respect to automated assistant client 118. For example, in addition to or in lieu of including automated assistant client 118, one or more assistant input devices 106 can include a second automated assistant 120 that can include a speech capture component, TTS, STT, NLP, and/or one or more fulfillment engines for processing requests that are received from the user. In some implementations, second automated assistant 120 can include one or more cloud-based components that are unique from the cloud-based components 119. For example, second automated assistant 120 can be a standalone automated assistant with capabilities to process audio data, recognize one or more wakewords and/or invocation phrases, process additional audio data to identify a request that is included in the audio data, and cause one or more actions to be performed in response to the request.

Figure 2:
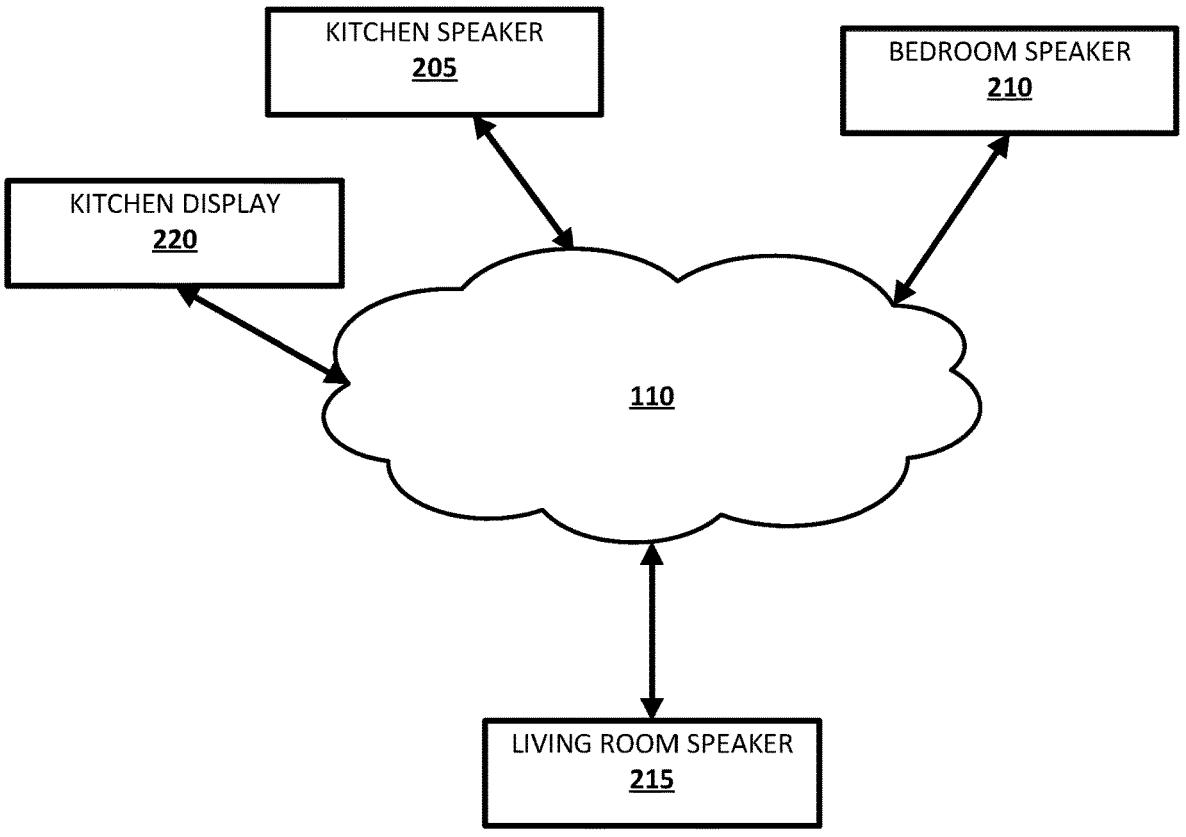
FIG. 2 is an illustration of an example ecosystem of connected devices.

Referring to FIG. 2, an illustration of an ecosystem of connected devices is provided for example purposes. In some implementations, an ecosystem can include additional components, fewer components, and/or different components than what are illustrated in FIG. 2. However, for example purposes, the illustrated ecosystem will be utilized as an example that includes a kitchen speaker 205, a bedroom speaker 210, a living room speaker 215, and a kitchen display 220, each including one or more components of an assistant input device 106. For example, kitchen speaker 205 can be executing a first automated assistant client 118 that further includes one or more of the components of the automated assistant client 118 illustrated in FIG. 1 (and further, one or more sensors 105 and/or user interface components 107). The ecosystem of FIG. 2 can include devices that are connected to one another and that are further in the environment of the user but in different locations. For example, a user may have a kitchen speaker 205 and kitchen display 220 sitting on a counter in the kitchen, bedroom speaker 210 in a bedroom, and a living room speaker 215 in a living room. Thus, for explanation purposes only, speakers of devices 205, 210, 215, and 220 can be heard by the user (thus can respond to requests) and/or microphones of the devices 205, 210, 215, and 220 can capture audio data of a user uttering an invocation phrase and/or request while the user is near (i.e., co-present) with the device.

In some implementations, the automated assistant executing on one of the devices of the ecosystem of devices can be invoked by the user performing an action (e.g., touching the device, performing a gesture that is captured by a camera of the device) and/or uttering an invocation phrase that indicates that the user has interest in the automated assistant performing one or more actions. For example, the user can utter "OK Kitchen Assistant," and the automated assistant of kitchen speaker 205 can process audio that precedes and/or follows the invocation to determine whether a request is included in the audio data. Audio data that is captured by the microphones of kitchen speaker 205 can be processed, utilizing STT, NLP, and/or ASR, by the automated assistant client that was invoked.

Upon determining that the audio data includes a request, action processing engine 180 (shown in FIG. 1 as a component of memory 119, but can additionally or alternatively be a component of automated assistant client 118 and/or 120) can determine one or more actions to perform and cause performance of the action(s). For example, the user may utter "OK Kitchen Assistant," followed by "how tall is Barack Obama." In response, action processing engine 180 can generate a response to the request (or "query") and provide, via the microphone(s) 109 of kitchen speaker 205, a response to the query.

In some implementations, when an additional assistant input device 106 is added to an ecosystem, such as the ecosystem that is illustrated in FIG. 2, an automated assistant can be selected as the primary automated assistant for the device 106. For example, in the case where the newly added assistant input device 106 includes a first automated assistant 118 and a second automated assistant 120, one of the automated assistants can be selected as the primary automated assistant for the device 106. Further, in some implementations, when a device 106 is added to an ecosystem, the primary automated assistant for one or more of the other devices of the ecosystem can be changed based on the placement (e.g., location) of the newly added assistant input device 106, the configuration of the newly added assistant input device 106, and/or other factors, as described herein.

For a given assistant input device 106 of the ecosystem of assistant input devices 106 (e.g., the newly added and/or one of the other existing assistant input devices 106 of the ecosystem), one or more factors can be utilized to determine an affinity score for each automated assistant executing on the device and/or that is capable of being installed on the device. For example, referring to FIG. 2, kitchen speaker 205 may have two automated assistants executing on the device: a "Kitchen Automated Assistant" and a "Music Automated Assistant." The "Kitchen Automated Assistant may have previously been selected as the primary automated assistant for the device 106, as described further herein, and in addition, a "General Automated Assistant" may further be available to install on the kitchen speaker 205, though not currently installed.

For each of the candidate automated assistants for the kitchen device 205, an affinity measure can be generated that indicates, for a given automated assistant, suitability for the automated assistant to be a primary automated assistant for the device. As described further herein, a primary automated assistant of a device can be prioritized when resources of the device are allocated such that the execution of the primary automated assistant takes precedence over other automated assistants executing on the device. For example, if first automated assistant 118 is selected as the primary automated assistant for the assistant input device 106, first automated assistant 118 can be given preference over second automated assistant 120 if memory 119 is limited such that only one of the automated assistants can utilize free space in the memory 119.

In some implementations, previous requests that have been processed by an automated assistant of the assistant input device 106 can be utilized to determine an affinity measure. For example, if requests of "OK Assistant, set a timer," "OK Assistant, preheat the oven to 350," and "OK Assistant, how do I make peach cobbler?" have been previously submitted for processing on the assistant input device 106 over a previous period of time (e.g., over the last week, month, since primary automated assistant was last changed for the device), an affinity score for a "kitchen automated assistant" may be more indicative of suitability than a "music automated assistant." However, if, for example, requests related to playing music (e.g., "OK Assistant, play Band A") are provided more than kitchen-related requests, a "music automated assistant" may have a resulting affinity score that is higher than a "kitchen automated assistant."

In some implementations, an assistant input device 106 may be provided with a descriptor, either by the user and/or as a default. For example, referring to FIG. 2, the devices of the illustrated ecosystem each have a descriptor that indicates the type of device (e.g., "speaker" or "display") and further indicate a location (e.g., "kitchen" and/or "living room"). In some implementations, the descriptor for an assistant input device 106 may indicate which, of a plurality of automated assistants, is most suitable to select as a primary automated assistant for the device. For example, an affinity measure for a "kitchen automated assistant" may be higher than an affinity measure for a "music automated assistant" on a device that has been labeled as a "kitchen speaker," and an affinity score for a "music automated assistant" may be higher on a "speaker" device than on a "display" device (whereas a video-playing automated assistant may be the opposite). In some implementations, an assistant input device 106 may determine that it is in proximity to another device (e.g., the "kitchen speaker" 205 and the "kitchen display" 220). In some implementations, a device can determine its likely usage based on being in proximity (e.g., in the same room) as another device whose intended purpose is known. For example, the "kitchen display" 220 may not have a descriptor of "kitchen display," but its intended usage may be determined based on determining that the "kitchen display" is collated with a device with a descriptor of "kitchen speaker" and previously determining that the "kitchen speaker" has been utilized to perform kitchen tasks.

In some implementations, characteristics of the assistant input device 106 can be utilized to determine an affinity measure for one or more automated assistants. For example, the amount of memory 119 can be utilized to determine whether the assistant input device 106 has enough storage capacity to accommodate one or more of the automated assistants. Also, for example, an automated assistant that utilizes more processor power to execute may have an affinity score that is more indicative of suitability for an assistant input device 106 with higher processing speed and/or more RAM than another assistant input device 106 with lower capabilities. Thus, when selecting a primary automated assistant for a device with lower capabilities, an affinity measure for a resource-intensive automated assistant may be lower than an affinity measure for an automated assistant that requires fewer resources.

In some implementations, usage frequency of an automated assistant can be utilized to determine an affinity measure for the automated assistant. For example, an affinity measure for an automated assistant that has been utilized by the user frequently in past interactions may be higher than an affinity score for another, less frequently used, automated assistant. Further, if a particular automated assistant has been utilized more frequently on an assistant input device than another automated assistant, the affinity score of the more frequently utilized automated assistant may be higher than one or more other, less frequently utilized, automated assistants for that device. As an example, a user may explicitly invoke an automated assistant that is a secondary automated assistant on a device more often and/or more times than the primary automated assistant for that device. Subsequently, when primary automated assistants for the ecosystem are reevaluated, the secondary automated assistant that has been more frequently invoked may be assigned an affinity score, thereby increasing likelihood of the secondary automated assistant being selected as the primary automated assistant.

In instances where an assistant input device 106 is newly added to the ecosystem and/or has not been previously utilized by the user, one or more default settings can be utilized to determine affinity measures for one or more automated assistants. For example, a user can add an assistant input device 106 to an ecosystem that is initially configured as a general device to respond to general requests (e.g., "What is the weather today?," "What is the capital of Vermont?"). A general automated assistant may be assigned an affinity score that is higher than other automated assistants and, subsequently, the suitability of the general automated assistant can be reevaluated to determine whether selecting the general automated assistant as the primary automated assistant was the most appropriate once additional data is available (e.g., usage frequency, descriptor for the device).

Primary automated assistant determination engine 130 can determine, for an assistant input device 106, affinity measures for a plurality of automated assistants and select one of the automated assistants as the primary automated assistant for the assistant input device 106. In some implementations, primary automated assistant determination engine 130 can utilize a heuristic and/or machine learning model to determine affinity scores for a plurality of automated assistants. For example, primary automated assistant determination engine 130 can provide, as input to a machine learning model, one or more of the previously described characteristics of the assistant input device 106 and/or the automated assistant. The machine learning model can generate, as output, a numerical value indicative of the suitability of that automated assistant as the primary automated assistant for the assistant input device 106. For example, primary automated assistant determination engine 130 can process, using a machine learning model, a descriptor for the assistant input device 106, a type for the first automated assistant 118 (e.g., "general automated assistant," "music automated assistant"), and the machine learning model can generate a numerical value between 0.0 and 1.0, with 0.0 indicating "unsuitable" and 1.0 indicating "very suitable." Further, primary automated assistant determination engine 130 can perform a similar processing of a second automated assistant 120, resulting in a second automated assistant affinity score. In other implementations, affinity scores can be determined based on one or more other techniques, such as by generating a vector in a similarity embedding space representing each of the automated assistants, utilizing a neural network, such as a graph neural network (GNN), and/or one or more other techniques that indicates, for a given automated assistant, the suitability of selecting that automated assistant as a primary automated assistant for a device.

In some implementations, generating the affinity measures can be performed by one or more components that are executing on a device other than the assistant input device 106. For example, primary automated assistant determination engine 130 can be executed on a device that is separate from the assistant input device 106. Signals described herein can be provided, via one or more communication networks, to a device with more computing resources that is executing one or more models (e.g., machine learning models, graph neural networks). Thus, in some implementations, none of the devices of the ecosystem may determine that affinity scores for automated assistants. In some implementations, affinity scores can be determined by a component of one of the assistant input devices 106 that is a part of the ecosystem, though, in some instances, not the same device for which the affinity scores are being determined. For example, the "kitchen speaker" 205 device may have storage and computing power to store and execute a machine learning model to determine affinity scores. Each of the other devices can provide, as input, device information, automated assistant usage information, and/or other information to the "kitchen speaker" 205 device, which can process the inputs and provide, as output, a numerical value to each of the other devices of the ecosystem. Thus, in some implementations, each of the assistant input devices of an ecosystem can generate (or be provided with) affinity scores for each of the candidate automated assistants that can execute on the device.

In some implementations, the automated assistants for each device can be ranked based on the generated automated assistants. Primary automated assistant determination engine 130 can generate a ranked list of the automated assistants that are capable of being executed on a given device. In some implementations, the ranking can be ordering the automated assistants according to affinity scores. In some implementations, the ranking can be determined based on utilizing one or more additional machine learning models and/or neural networks.

In some implementations, one of the automated assistants can be selected as the primary automated assistant for a device based on the ranking of the automated assistants. In some implementations, the highest ranked automated assistant can be selected as the primary automated assistant. In some implementations, the highest ranked automated assistant that has not been selected by another automated assistant device as its primary automated assistant may be selected as the primary automated assistant. For example, both "kitchen speaker" 205 and "kitchen interface" 220 may have a "kitchen automated assistant" as the highest ranked automated assistant. "Kitchen speaker" 205 may select the "kitchen automated assistant" as its primary automated assistant. In response, "kitchen interface" 220 may select a different automated assistant as the primary automated assistant to ensure that the user will have access to more than one automated assistant when uttering a request in the "kitchen."

In some implementations, once an automated assistant has been selected as the primary automated assistant for a given device, resource allocation engine 140 can determine which resources of the assistant input device 106 to allocate to the primary automated assistant. For example, first automated assistant 118 may be selected as the primary automated assistant for the assistant input device 106. Subsequently, second automated assistant 120, also executing on assistant input device 106, may request additional storage space. Resource allocation engine 140 may only grant the request if first automated assistant 118 does not need the storage space, and/or resource allocation engine 140 may deny the request because second automated assistant 120 is not the primary automated assistant for the assistant input device 106.

As described, the previous process can be performed by each of the assistant input devices 106 of an ecosystem. Thus, for each of the assistant input devices 106 an ecosystem, the automated assistants that can be installed (or are currently installed) are ranked for each device, resulting in potentially different ranking for an automated assistant on one device over the ranking of the automated assistant on a different device. For example, "kitchen speaker" 205 can determine affinity scores for a plurality of automated assistants and "kitchen display 220" can determine affinity scores for the same (or a subset) of the automated assistants. Subsequently, a primary automated assistant can be selected for each of the devices.

In some implementations, the highest ranked automated assistant for a device can be selected as the primary automated assistant for the device. For example, a "kitchen automated assistant" may be highest ranked for a "kitchen speaker" 205, and subsequently, the "kitchen automated assistant" can be selected as the primary automated assistant for that device. Further, a "video automated assistant" may be highest ranked for "living room speaker" 215 and that automated assistant can be selected as the primary automated assistant for that device. Each device in the ecosystem can iteratively select a primary automated assistant until each device has selected a primary automated assistant.

In some implementations, the highest ranked automated assistant that has not been selected as a primary automated assistant on any other device can be selected as the primary automated assistant for a device. For example, "kitchen speaker" device 205 may have a "kitchen automated assistant" selected as the primary automated assistant for that device. "Kitchen automated assistant" may also be the highest ranked automated assistant for "kitchen display" 220. However, instead of also selecting "kitchen automated assistant" as the primary automated assistant for "kitchen display" 220, the next highest automated assistant (that has not been selected by another device and/or by another device located in the kitchen) may be selected as its primary automated assistant, such as a "music automated assistant."

In some implementations, one or more consistently highly ranked automated assistants may be selected as a primary automated assistant on multiple devices. For example, a "general automated assistant," capable of responding to general requests (e.g., "What is the weather today?") may be selected as a primary automated assistant by multiple automated assistant devices. Thus, for example, each room in a house may have at least one automated assistant device that has the "general automated assistant" executing such that the user has access to that automated assistant regardless of where in the house the user is located when issuing a request.

Once a primary automated assistant has been selected for each device, one or more other automated assistants can be selected for each device to also execute on the device if there are additional resources to accommodate the additional automated assistant(s). For example, a first automated assistant 118 may be selected as the primary automated assistant for the assistant input device 106. However, if additional resources are available, a second automated assistant 120 may be installed and/or otherwise be permitted to execute on the device with the remaining resources of the device. If, subsequently, both the first automated assistant 118 and the second automated assistant 120 request a resource, the resource allocation engine 140 may permit the first automated assistant 118 to utilize the resource while denying the same resource to the second automated assistant 120 based on the first automated assistant 118 being selected as the primary automated assistant for the device 106.

In some implementations, secondary automated assistant (s) can be selected to execute on devices to ensure that all candidate automated assistants are executing on at least one device of the ecosystem. For example, once a primary automated assistant is selected for each of the devices of an ecosystem, the unselected automated assistants may be distributed among the devices to maximize access to as many of the automated assistants as possible. If one or more of the automated assistants is not executing on any of the devices, the user may be provided with a prompt to indicate that an automated assistant is not available. In response, the user may provide an indication to make the automated assistant available, uninstall and/or limit resource availability of one of the other automated assistants, and/or otherwise indicate interest in having the unselected automated assistant available on at least one device.

In some implementations, the previously described selection of primary automated assistants for devices of an ecosystem can occur when a new assistant input device is added to the ecosystem. For example, a new device can be added to an existing ecosystem, such as a "bedroom display" device to the ecosystem of FIG. 2. In response, the primary automated assistants of one or more of the other devices can be reevaluated to determine whether the primary automated assistant of any of the devices should change. For example, the "bedroom speaker" 210 may have a "meditation automated assistant" as a primary automated assistant that provides both audio and video responses. Upon adding a "bedroom display," newly determined affinity scores may indicate that the "bedroom display" is best suited for the "meditation automated assistant" and a "music automated assistant" better suited for the "bedroom speaker" 215.

In some implementations, the previously described selection of primary automated assistant for devices of an ecosystem can occur periodically to reflect additional information that is obtained since the previous selection of primary automated assistants. For example, when initially added to an ecosystem, a device may not have some or all information to determine the best automated assistant to select as the primary automated assistant for the device. However, once a number of requests have been issued by the user, additional data regarding usage frequency, types of queries, automated assistant capabilities, and/or other information may change affinity measures for one or more automated assistants. Thus, the selection of automated assistants for the devices may occasionally be reevaluated and primary automated assistants changed to reflect the behavior of users when interacting with the devices and automated assistants executing on the devices.

In some implementations, selection of primary automated assistants for one or more of the assistant input devices can change according to one or more other factors. For example, a first automated assistant can be selected as the primary automated assistant for a given device during office hours (e.g., 9 am to 5 pm) whereas a different automated assistant can be selected as the primary automated assistant in the evening. Also, for example, a first automated assistant can be selected as the primary automated assistant when presence of a first user is identified and a second automated assistant can be selected as primary automated assistant when a second user is identified as present near the device.

Although the previously described implementations can be utilized to select a primary automated assistant for one or more devices of an ecosystem of connected devices, in some implementations, a user can indicate personal preferences to change the primary automated assistant for one or more of the devices. For example, a user can indicate that each room of a house has at least one device with a particular automated assistant selected as the primary automated assistant, change the primary automated assistant for any given device, and/or otherwise indicate a preference for one automated assistant over other automated assistants for one or more of the devices.

Figure 3:
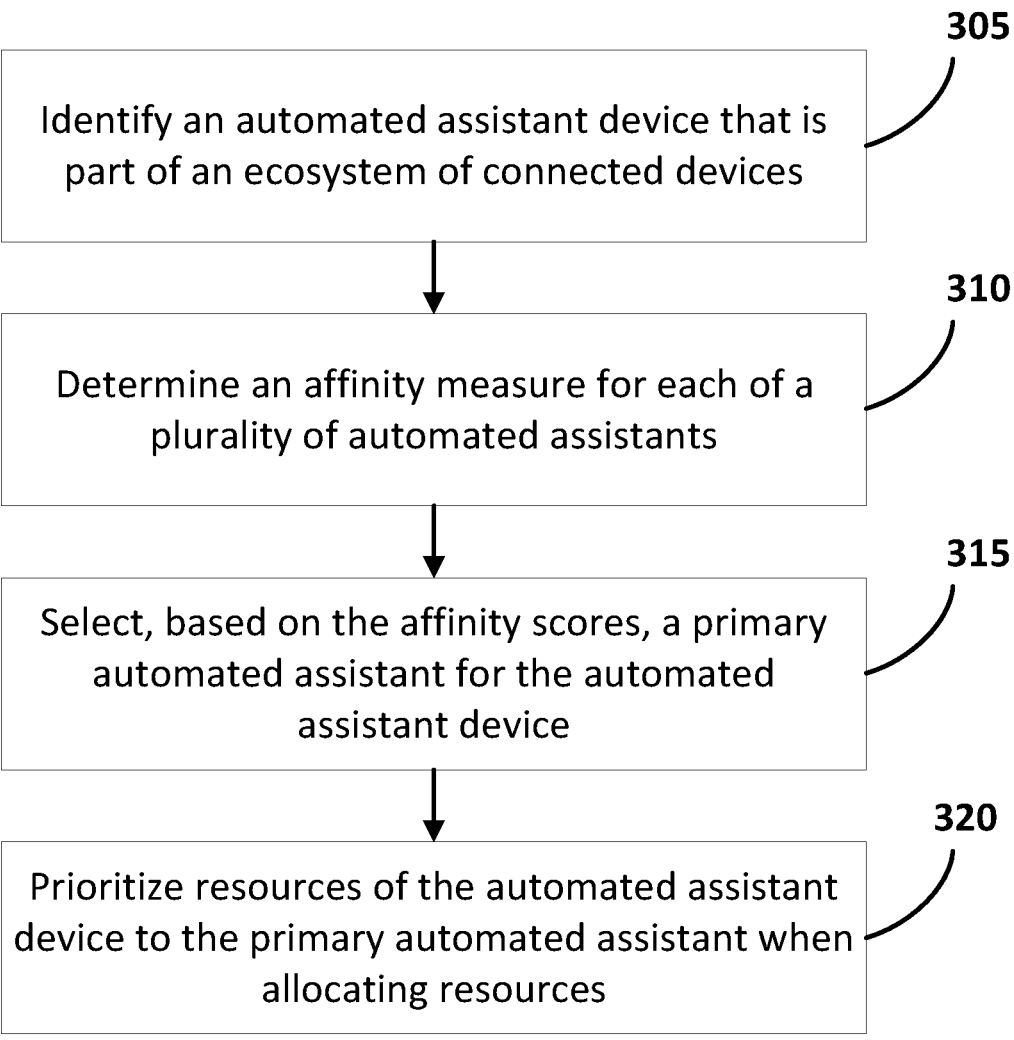
FIG. 3 is a flowchart illustrating an example method according to various implementations disclosed herein.

Referring to FIG. 3, a flowchart is provided that illustrates a method of selecting a primary automated assistant for an assistant input device. For convenience, the operations of the method are described with reference to a system that performs the operations, such as the system illustrated in FIG. 1. This system of method includes one or more processors and/or other component(s) of a client device. Moreover, while operations of the method are shown in a particular order, this is not meant to be limiting. One or more operations may be reordered, omitted, or added.

At step 305, an automated assistant device that is part of an ecosystem of connected devices is identified. The identified automated assistant device can share one or more characteristics with assistant input device 106. In some implementations, the identified automated assistant device can be a newly added device to the ecosystem. In some implementations, the device can already be a part of the ecosystem and the identification can be based on determining that one or more of the devices of the ecosystem should be reevaluated to determine whether a different automated assistant is more suitable for selection as the primary automated assistant for the device.

At step 310, an affinity measure is determined for each of a plurality of automated assistants that are capable of executing on the identified automated assistant device. As previously described, the affinity measure can be determined, for each of the automated assistants, by a component that shares one or more characteristics with primary automated assistant determination engine 130. In some implementations, one or more of the previously described signals can be utilized to determine an affinity score for a given automated assistant. For example, device descriptor, device capabilities, automated assistant requirements, automated assistant usage frequency, and/or other factors can be utilized by primary automated assistant determination engine 130 to generate an affinity score for a plurality of automated assistants.

At step 315, a primary automated assistant is selected from the plurality of automated assistants based on the affinity scores. The evaluated automated assistants can be ranked according to affinity score and one of the automated assistants can be selected as the primary automated assistant. In some implementations, an automated assistant can be selected only if one or more of the other automated assistant devices of the ecosystem have not already selected the automated assistant as a primary automated assistant. In some implementations, an automated assistant can be selected as the primary automated assistant for multiple devices. For example, a highly ranked automated assistant may be selected as a primary automated assistant for at least one device in each room of a user's house so that the automated assistant is available and prioritized in any location where the user may issue a request.

At step 320, resources of the automated assistant device are prioritized to the primary automated assistant when allocating the resources of the automated assistant device. Resource allocation engine 140 can determine which automated assistant executing on a device should be allocated a given resource. For example, first automated assistant 118 may be selected as the primary automated assistant for the assistant input device 106. Subsequently, second automated assistant 120 may request additional storage space in memory 119 to store additional NLP models. However, the request for additional storage may be denied because second automated assistant 120 is not the primary automated assistant for the device 106. Instead, additional memory 119 may be reserved for additional models and/or other components that may be required by first automated assistant 118. Also, for example, both first automated assistant 118 and second automated assistant may request usage of one or more processors 112. If first automated assistant 118 has been selected as the primary automated assistant, the request from second automated assistant 120 may be denied and/or otherwise subjugated to the request of first automated assistant 118.

Figure 4:
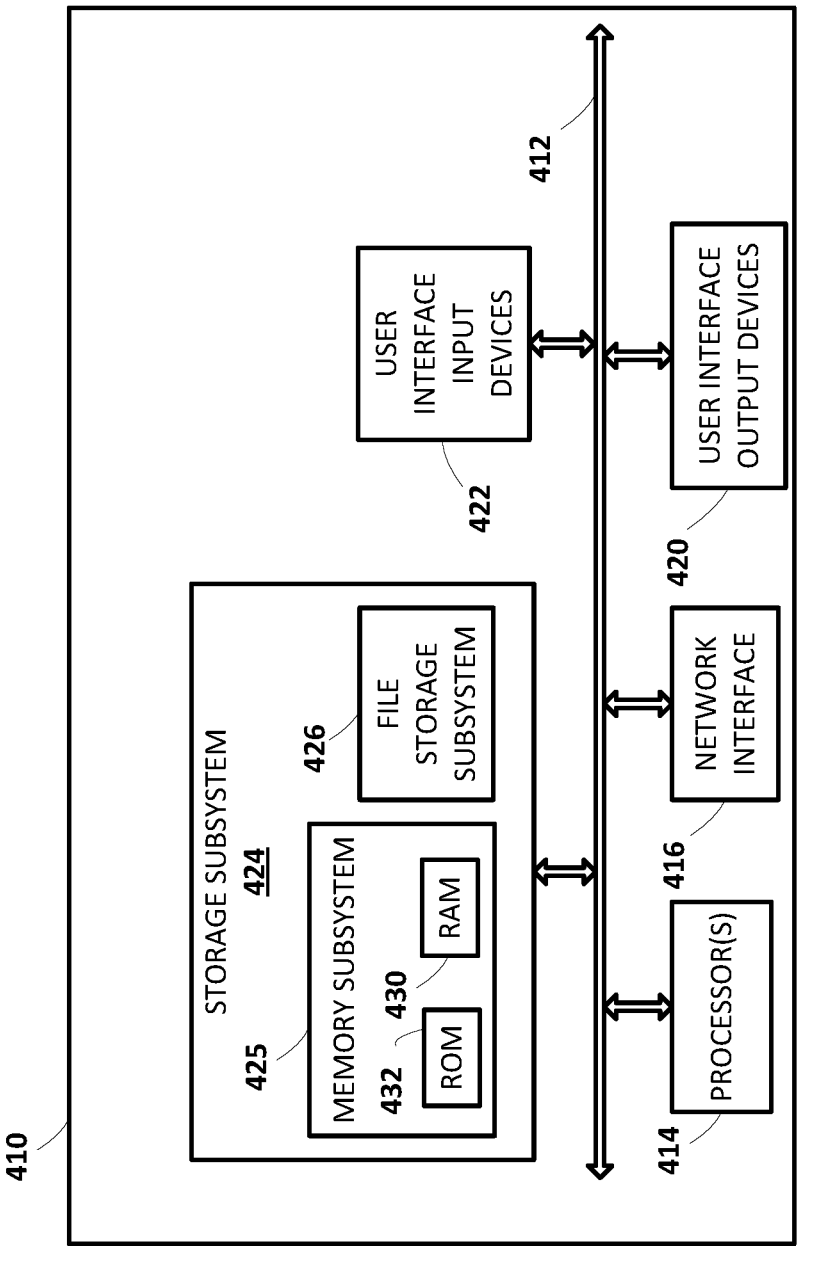
FIG. 4 illustrates an example architecture of a computing device.

FIG. 4 is a block diagram of an example computing device 410 that may optionally be utilized to perform one or more aspects of techniques described herein. Computing device 410 typically includes at least one processor 414 which communicates with a number of peripheral devices via bus subsystem 412. These peripheral devices may include a storage subsystem 424, including, for example, a memory subsystem 425 and a file storage subsystem 426, user interface output devices 420, user interface input devices 422, and a network interface subsystem 416. The input and output devices allow user interaction with computing device 410. Network interface subsystem 416 provides an interface to outside networks and is coupled to corresponding interface devices in other computing devices.

User interface input devices 422 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 410 or onto a communication network.

User interface output devices 420 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 410 to the user or to another machine or computing device.

Storage subsystem 424 stores programming and data constructs that provide the functionality of some or all of the modules described herein. For example, the storage subsystem 424 may include the logic to perform selected aspects of the methods of FIGS. 4-6, and/or to implement various components depicted in FIG. 1.

These software modules are generally executed by processor 414 alone or in combination with other processors. Memory 425 used in the storage subsystem 424 can include a number of memories including a main random access memory (RAM) 430 for storage of instructions and data during program execution and a read only memory (ROM) 432 in which fixed instructions are stored. A file storage subsystem 426 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 426 in the storage subsystem 424, or in other machines accessible by the processor(s) 414.

Bus subsystem 412 provides a mechanism for letting the various components and subsystems of computing device 410 communicate with each other as intended. Although bus subsystem 412 is shown schematically as a single bus, alternative implementations of the bus subsystem may use multiple busses.

Computing device 410 can be of varying types including a workstation, server, computing cluster, blade server, server farm, or any other data processing system or computing device. Due to the ever-changing nature of computers and networks, the description of computing device 410 depicted in FIG. 4 is intended only as a specific example for purposes of illustrating some implementations. Many other configurations of computing device 410 are possible having more or fewer components than the computing device depicted in FIG. 4.

Implementations described herein disclose a computer implemented method, the method including the step of identifying an automated assistant device, wherein the automated assistant device is configured to execute a plurality of automated assistants, and wherein the automated assistant device is part of an ecosystem of connected devices. Further, for each of the plurality of automated assistants, the method further includes the step of determining a corresponding affinity measure, wherein the corresponding affinity measure for a given automated assistant is indicative of suitability of the given automated assistant to fulfill requests of the user, and wherein the corresponding affinity measure for the given automated assistant is based on capabilities of the automated assistant device to execute the corresponding automated assistant. Finally, the method includes the steps of selecting, based on the affinity measures, a primary automated assistant from the plurality of automated assistants, and prioritizing the primary automated assistant when allocating resources of the automated assistant device and in lieu of other automated assistants of the plurality of automated assistants executing on the automated assistant device.

These and other implementations of the technology disclosed herein can include one or more of the following features.

In some implementations, determining each of the corresponding affinity measures is based, at least in part, on a descriptor of the automated assistant device.

In some implementations, determining each of the corresponding affinity measures is based, at least in part, on a location of the automated assistant device.

In some implementations, determining each of the corresponding affinity measures is based, at least in part, on location of one or more other connected devices.

In some implementations, wherein determining each of the corresponding affinity measures is based, at least in part, on resource requirements of the given automated assistant.

In some implementations, wherein determining each of the corresponding affinity measures is based, at least in part, on previous requests of the user that were processed by one or more of the automated assistants executing on the automated assistant device.

In some implementations, wherein determining the affinity measure of a given automated assistant is based, at least in part, on a number of requests previously processed by the given automated assistant.

In some implementations, selecting the primary automated assistant includes selecting, as the primary automated assistant, the automated assistant with the corresponding affinity score that is highest amongst all of the corresponding affinity scores.

In some implementations, selecting the primary automated assistant includes determining that the automated assistant with the highest affinity score is a primary automated assistant of one of the connected devices, and selecting, as the primary automated assistant, the automated assistant with the next highest affinity score as the primary assistant of the automated assistant device.

In some implementations, prioritizing the primary automated assistant includes determining that the primary automated assistant and a second automated assistant executing on the automated assistant device require a portion of memory space of the automated assistant device, and authorizing the primary automated assistant to utilize the portion of memory space in lieu of authorizing the second automated assistant to utilize the portion of memory space.

In some implementations, prioritizing the primary automated assistant includes determining that the primary automated assistant and a second automated assistant executing on the automated assistant device require usage of a hardware component of the automated assistant device, and authorizing the primary automated assistant to utilize the hardware component in lieu of authorizing the second automated assistant to utilize the hardware component.

In some implementations, the hardware component is a digital signal processor.

In situations in which certain implementations discussed herein may collect or use personal information about users (e.g., user data extracted from other electronic communications, information about a user's social network, a user's location, a user's time, a user's biometric information, and a user's activities and demographic information, relationships between users, etc.), users are provided with one or more opportunities to control whether information is collected, whether the personal information is stored, whether the personal information is used, and how the information is collected about the user, stored and used. That is, the systems and methods discussed herein collect, store and/or use user personal information only upon receiving explicit authorization from the relevant users to do so.

For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The invention claimed is:

1. A computer implemented method, comprising:
identifying an automated assistant device, wherein a plurality of automated assistants are executing on the automated assistant device utilizing resources of the automated assistant device, and wherein the automated assistant device is part of an ecosystem of connected devices;

for each of the plurality of automated assistants executing on the automated assistant device, determining a corresponding affinity measure, wherein the corresponding affinity measure for a given automated assistant is indicative of suitability of the given automated assistant to fulfill requests of a user, and wherein the corresponding affinity measure for the given automated assistant is based on capabilities of the automated assistant device to execute the given automated assistant;

selecting, based on the corresponding affinity measures, a primary automated assistant from the plurality of automated assistants executing on the automated assistant device; and prioritizing the primary automated assistant when allocating resources of the automated assistant device and in lieu of an alternate automated assistant of the plurality of automated assistants executing on the automated assistant device.

2. The method of claim 1, wherein determining each of the corresponding affinity measures is based, at least in part, on a descriptor of the automated assistant device.

3. The method of claim 1, wherein determining each of the corresponding affinity measures is based, at least in part, on a location of the automated assistant device.

4. The method of claim 1, wherein determining each of the corresponding affinity measures is based, at least in part, on location of one or more other connected devices.

5. The method of claim 1, wherein determining each of the corresponding affinity measures is based, at least in part, on resource requirements of the given automated assistant.

6. The method of claim 1, wherein determining each of the corresponding affinity measures is based, at least in part, on previous requests of the user that were processed by one or more automated assistants, of the plurality of automated assistants executing on the automated assistant device.

7. The method of claim 1, wherein determining the corresponding affinity measure of the given automated assistant is based, at least in part, on a number of requests previously processed by the given automated assistant.

8. The method of claim 1, wherein selecting the primary automated assistant includes:
selecting, as the primary automated assistant, an automated assistant with the corresponding affinity measure that is highest amongst all of the corresponding affinity measures.

9. The method of claim 1, wherein selecting the primary automated assistant includes:
determining that an automated assistant with a highest affinity score is a primary automated assistant of one of the connected devices; and
selecting, as the primary automated assistant, the automated assistant with a next highest affinity score as the primary assistant of the automated assistant device.

10. The method of claim 1, wherein prioritizing the primary automated assistant includes:
determining that the primary automated assistant and a second automated assistant executing on the automated assistant device require a portion of memory space of the automated assistant device; and
authorizing the primary automated assistant to utilize the portion of memory space in lieu of authorizing the second automated assistant to utilize the portion of memory space.

11. The method of claim 1, wherein prioritizing the primary automated assistant includes:

determining that the primary automated assistant and a second automated assistant executing on the automated assistant device require usage of a hardware component of the automated assistant device; and authorizing the primary automated assistant to utilize the hardware component in lieu of authorizing the second automated assistant to utilize the hardware component.

12. The method of claim 11, wherein the hardware component is a digital signal processor.

13. A system, comprising:

a processor, a computer-readable memory, one or more computer-readable storage media, and program instructions collectively stored on the one or more computer-readable storage media, the program instructions executable to:

identify an automated assistant device, wherein a plurality of automated assistants are executing on the automated assistant device utilizing resources of the automated assistant device, and wherein the automated assistant device is part of an ecosystem of connected devices;

for each of the plurality of automated assistants executing on the automated assistant device, determine a corresponding affinity measure, wherein the corresponding affinity measure for a given automated assistant is indicative of suitability of the given automated assistant to fulfill requests of a user, and wherein the corresponding affinity measure for the given automated assistant is based on capabilities of the automated assistant device to execute the given automated assistant;

select, based on the corresponding affinity measures, a primary automated assistant from the plurality of automated assistants executing on the automated assistant device; and prioritize the primary automated assistant when allocating resources of the automated assistant device and in lieu of an alternate automated assistant of the plurality of automated assistants executing on the automated assistant device.

14. The system of claim 13, wherein determining each of the corresponding affinity measures is based, at least in part, on a descriptor of the automated assistant device.

15. The system of claim 13, wherein determining each of the corresponding affinity measures is based, at least in part, on a location of the automated assistant device.

16. The system of claim 13, wherein determining each of the corresponding affinity measures is based, at least in part, on location of one or more other connected devices.

17. The system of claim 13, wherein determining each of the corresponding affinity measures is based, at least in part, on resource requirements of the given automated assistant.

18. The system of claim 13, wherein determining each of the corresponding affinity measures is based, at least in part, on previous requests of the user that were processed by one or more automated assistants, of the plurality of automated assistants executing on the automated assistant device.

19. The system of claim 13, wherein determining the corresponding affinity measure of the given automated assistant is based, at least in part, on a number of requests previously processed by the given automated assistant.

20. The system of claim 13, wherein selecting the primary automated assistant includes:

selecting, as the primary automated assistant, an automated assistant with the corresponding affinity measure that is highest amongst all of the corresponding affinity measures.

* * * * *